United States Patent
Åström et al.

(10) Patent No.: US 10,412,656 B2
(45) Date of Patent: Sep. 10, 2019

(54) PATH SELECTION IN WIRELESS MESH NETWORKS

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/578,578

(22) PCT Filed: Jun. 22, 2015

(86) PCT No.: PCT/EP2015/063948
§ 371 (c)(1),
(2) Date: Nov. 30, 2017

(87) PCT Pub. No.: WO2016/206709
PCT Pub. Date: Dec. 29, 2016

(65) Prior Publication Data
US 2018/0139679 A1  May 17, 2018

(51) Int. Cl.
*H04W 40/12* (2009.01)
*H04L 12/707* (2013.01)
(Continued)

(52) U.S. Cl.
CPC ............. *H04W 40/12* (2013.01); *H04L 5/14* (2013.01); *H04L 45/24* (2013.01); *H04W 48/16* (2013.01); *H04L 5/0023* (2013.01); *H04W 84/18* (2013.01)

(58) Field of Classification Search
CPC ... H04W 40/12; H04W 40/24; H04W 40/246; H04W 48/16; H04W 84/12; H04W 84/18;
(Continued)

(56) References Cited

U.S. PATENT DOCUMENTS 6,961,310 B2 * 11/2005 Cain .................. H04L 45/02
370/238
7,929,446 B2 * 4/2011 Bozarth .............. H04L 41/22
370/235
(Continued)

FOREIGN PATENT DOCUMENTS

CN   103312606 A   9/2013
EP   1901498 A2   3/2008
(Continued)

OTHER PUBLICATIONS

Gómez-Cuba, F. et al., "A Survey on Cooperative Diversity for Wireless Networks", IEEE Communications Surveys & Tutorials, 2012, pp. 822-835, vol. 14, No. 3.
(Continued)

*Primary Examiner* — Tri H Phan
(74) *Attorney, Agent, or Firm* — Coats & Bennett, PLLC

(57) ABSTRACT

The proposed technology relates to path selection in wireless mesh networks. In particular the disclosure relates to methods for selection of one or more transmission paths from an originating node to a target node in a wireless mesh network, wherein there are at least two possible transmission paths between the originating node and the target node. More specifically, the disclosure proposes a method, performed in an originating node in a wireless network comprising several nodes wirelessly connected to each other, for enabling selection of a transmission path from the originating node to a target node, wherein there are at least two possible transmission paths between the originating node and the target node. The method comprises the steps of receiving S1 discovery signals from nodes in the at least two possible transmission paths and estimating S2, based on the received discovery signals, radio channels H for transmission from the originating node to the nodes transmitting the discovery signals. The method further comprises calculating S3, for
(Continued)

different transmission modes, based on the estimated radio channels, metrics of links from the originating node to the nodes transmitting the discovery signals, wherein at least one of the transmission modes involves simultaneous transmission from the originating node to at least two of the nodes transmitting the discovery signals and transmitting S4 the calculated metrics to an adjacent node. The disclosure also relates to the corresponding apparatuses and computer programs.

21 Claims, 8 Drawing Sheets

(51) Int. Cl.
    *H04L 5/14* (2006.01)
    *H04W 48/16* (2009.01)
    *H04W 84/18* (2009.01)
    *H04L 5/00* (2006.01)

(58) Field of Classification Search
    CPC .............. H04W 40/16; H04W 40/20; H04W 40/26–30; H04W 40/248; H04W 48/18; H04W 48/20; H04L 29/08; H04L 45/24; H04L 5/0023; H04L 5/14; H04L 12/707; H04L 67/104; H04L 45/00; H04L 45/02; H04L 45/12; H04L 45/26; H04L 29/08396; H04L 29/08648; H04L 61/1541
    See application file for complete search history.

(56) References Cited

U.S. PATENT DOCUMENTS

| | | | |
|---|---|---|---|
| 7,940,669 B2 * | 5/2011 | Vaswani | H04L 45/00 370/238 |
| 7,941,149 B2 | 5/2011 | Wang et al. | |
| 8,391,183 B2 * | 3/2013 | Furukoshi | H04W 16/00 370/238 |
| 8,432,820 B2 * | 4/2013 | Liu | H04L 45/124 370/252 |
| 8,612,821 B2 | 12/2013 | Grube et al. | |
| 8,929,199 B2 * | 1/2015 | Nishioka | H04W 40/02 370/216 |
| 9,749,217 B2 * | 8/2017 | Vasseur | H04L 12/4633 |
| 10,091,094 B2 * | 10/2018 | Garcia-Luna-Aceves | H04W 40/02 |
| 2002/0080888 A1 | 6/2002 | Shu et al. | |
| 2005/0015511 A1 | 1/2005 | Izmailov et al. | |
| 2005/0229072 A1 | 10/2005 | Setton et al. | |
| 2006/0034233 A1 | 2/2006 | Strutt et al. | |
| 2007/0025364 A1 | 2/2007 | Kodialam et al. | |
| 2008/0232238 A1 | 9/2008 | Agee | |
| 2009/0168653 A1 | 7/2009 | St. Pierre et al. | |
| 2009/0310485 A1 | 12/2009 | Averi et al. | |
| 2010/0329134 A1 | 12/2010 | Doppler et al. | |
| 2011/0255467 A1 | 10/2011 | Larsson | |
| 2012/0182865 A1 | 7/2012 | Andersen et al. | |
| 2012/0213076 A1 | 8/2012 | Wan et al. | |
| 2013/0051250 A1 * | 2/2013 | Shaffer | H04L 45/22 370/252 |
| 2013/0066951 A1 | 3/2013 | Agranat et al. | |
| 2014/0196025 A1 | 7/2014 | Corinella | |
| 2014/0286156 A1 | 9/2014 | Kohli | |
| 2015/0049640 A1 | 2/2015 | Ou et al. | |
| 2016/0164734 A1 * | 6/2016 | Durgin | H04L 41/0836 370/389 |
| 2016/0269275 A1 * | 9/2016 | Garcia-Luna-Aceves | H04W 40/02 |
| 2017/0013658 A1 * | 1/2017 | Ta | H04W 4/06 |
| 2017/0164263 A1 | 6/2017 | Lindoff et al. | |

FOREIGN PATENT DOCUMENTS

| | | | |
|---|---|---|---|
| EP | 2541803 A1 | 1/2013 | |
| WO | 2009156366 A1 | 12/2009 | |
| WO | 2010053347 A2 | 5/2010 | |
| WO | 2010083661 A1 | 7/2010 | |

OTHER PUBLICATIONS

Tsirigos, A. et al., "Multipath Routing in the Presence of Frequent Topological Changes", Design Methodologies for Adaptive and Multimedia Networks, IEEE Communications Magazine, Nov. 2001, pp. 132-138.

* cited by examiner

PATH SELECTION IN WIRELESS MESH NETWORKS

TECHNICAL FIELD

The proposed technology relates to path selection in wireless mesh networks. In particular the disclosure relates to methods for selection of one or more transmission paths from an originating node to a target node in a wireless mesh network, wherein there are at least two possible transmission paths between the originating node and the target node. The disclosure also relates to the corresponding apparatuses and computer programs.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or User Equipment units, UEs, communicate via a Radio Access Network, RAN, to one or more core networks. The Universal Terrestrial Radio Access Network, UTRAN, is the radio access network of a UMTS and Evolved UTRAN, E-UTRAN, is the radio access network of an LTE system. In a UTRAN and an E-UTRAN, a UE is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

Future communication systems are expected to, in many situations, be based on wireless ad hoc networks instead of, or in combination with, today's cellular communication approach with a central node, to which every device within reach of the central node should transmit the data. The terms ad hoc or Device-to Device, D2D, networking typically refers to a system of mutually communicating network elements that together form a network requiring little or no planning.

A mesh network is per definition a network topology in which each node relays data for the network and wherein all nodes cooperate in the distribution of data in the network. Mesh networks can be considered a type of an ad-hoc network. Thus, mesh networks are closely related to mobile ad hoc networks, MANETs, although MANETs also must also deal with problems introduced by the mobility of the nodes.

In mesh networks, routing is used in order to transmit a packet of data from a source node to a target node via interconnected nodes acting as relays between source and target. In general, routing can be defined as the act of moving information from a source node to a target node via one or more intermediate nodes in a communication network. In wired systems, where typically the bit error rates are negligible and any collisions are immediately detected upon transmission, resulting in a fixed per-link routing cost, routing is performed on the Internet Protocol, IP, level, using IP addresses.

Wireless routing, on the other hand, differs from wired in that wireless channels are significantly less reliable and more variable. The cost of routing a packet through a certain link is no longer constant but instead depending on the channel between the link nodes. In order to optimize performance with respect to either sparse radio spectrum resources, and/or packet latency, routing is preferably performed on a lower layer where knowledge of the wireless channel properties exists. In its simplest form, knowledge of a successful transmission of a packet along the route is obtained by the receiver transmitting an Acknowledgement, ACK, message back to the transmitter.

FIG. 1a shows an example scenario relevant for the present disclosure. In FIG. 1a the access points or nodes 10a-10f may be a subset of a number of nodes in an ad hoc or mesh network. Packets may be delivered from node 10a to node 10b and node 10a needs to choose a routing either via 10c, 10d or 10e, or a subset of 10c-e (i.e. choose two or three routes for simultaneous transmission) to 10b.

In prior art wireless meshed networks, such as according to the standard IEEE 802.11s, the path setup is performed by an Ad hoc On-Demand Distance Vector, AODV, using the airtime link metric, ATLM, which is an estimation of the total transmission "air time" for a packet.

The modulation and coding scheme for a given metric is e.g. based on reception of previous acknowledgement/non-acknowledgement, ACK/NACK, messages or from sounding requests that are independent from mesh signaling. Hence, from a system capacity point of view this is a very cumbersome and inaccurate procedure, in particular in a mesh network. Furthermore, the information regarding link quality that a transmitting node will get by receiving ACK/NACK:s from the receiving node is very rough. Furthermore, building relevant statistics from ACK/NACK:s may take some time and during the build-up phase there is a significant risk for unnecessary packet delays on the IP level that may reduce the Quality of Service in delay sensitive applications. Additionally, in a dynamic network the statistics is quickly outdated, which is also implying suboptimal performance.

In wireless mesh network one possibility is to choose routing based on channel quality for respective possible route to use. Such methods are described e.g. in U.S. Pat. No. 7,881,206 B2 disclosing a health aware routing protocol on the network that considers a combination of link quality and node health/residual lifetime metrics in the calculation of the desirability of nodes and links between nodes as parts of an overall route. In some cases also adaptation of Modulation and Coding Scheme, MCS, for the chosen route is also determined, as e.g. in International Patent Application WO2010083661 A1.

Furthermore, United States Patent Application US2010329134 A1 describes a method including determining a channel quality indication (CQI) value for each of a plurality of wireless sub-channels, discarding any of the CQI values older than a threshold time, leaving a set of current CQI values, determining a percentile CQI value based on the set of current CQI values and transmitting the percentile CQI value to an infrastructure node.

However, in some applications, for instance due to the respective link quality for the possible routes e.g. 10a-10c or 10a-10d, it might not be possible to fit in the received packet from 10f in a single route transmission, and fragmentation implies time delay of the packet.

Then an alternative could be to transmit the packet over different nodes as suggested in WO2010/053347. When transmitting a packet over different nodes, the scheduler routes a received data packet over several different routes, either as a duplicate of the packet, split it in sub packets and transmitted in FDM fashion or in a Multiple Input Multiple Output, MIMO, fashion, i.e. the data packet is split in two halves and sent over two different routes as sub-streams on the same time-frequency resources.

However, existing methods for path selection in wireless mesh networks do not fully exploit the advantages of multiple path routing.

SUMMARY

An object of the present disclosure is to provide methods and nodes which seeks to mitigate, alleviate, or eliminate one or more of the above-identified deficiencies in the art and disadvantages singly or in any combination and to provide a solution wherein the throughput and system capacity in a meshed network is increased. The present disclosure proposes methods and nodes for transmitting a data packet between two nodes in wireless networks.

The disclosure describes methods in a mesh network for setting up optimized paths from a source node, via one or more intermediary nodes, to a target node, where data may be transmitted in parallel over said paths in order to utilize the diversity gain arising from utilizing two or more paths.

More specifically, the disclosure proposes a method, performed in an originating node in a wireless network comprising several nodes wirelessly connected to each other, for enabling selection of a transmission path from the originating node to a target node, wherein there are at least two possible transmission paths between the originating node and the target node. The method comprises the steps of receiving discovery signals from nodes in the at least two possible transmission paths and estimating, based on the received discovery signals, radio channels H for transmission from the originating node to the nodes transmitting the discovery signals. The method further comprises calculating, for different transmission modes, based on the estimated radio channels, metrics of links from the originating node to the nodes transmitting the discovery signals, wherein at least one of the transmission modes involves simultaneous transmission from the originating node to at least two of the nodes transmitting the discovery signals and transmitting the calculated metrics to an adjacent node. One advantage by the proposed method is that by presenting multi-link transmission alternatives, it offers a better utilization of the radio resources in a wireless mesh network and thereby it allows for higher throughput and/or lower packet error rates and/or lower end-to-end latency etc.

According to some aspects, the metrics and/or the transmission properties are comprised in a Path Request, PREQ. According to some aspects, the transmitting comprises transmitting, for the different transmission modes, transmission properties corresponding to the calculated metrics. By exploiting transmission modes involving individual transmission properties for the different links, transmission properties may be optimized on link basis.

According to some aspects, the transmission mode implies a duplex transmission to at least two nodes, wherein data is split over different time/frequency resources to the respective nodes and wherein the transmission mode defines which time/frequency resources to use for each respective link. Hence, the method takes into account the fact that some time/frequency resources are better for one node whereas others are better for another node.

According to some aspects, the method comprises receiving, from at least one of the nodes transmitting the discovery signals, in response to the path request, information indicating at least one transmission path to use for transmitting data from the originating node to the target node.

According to some aspects, the disclosure relates to an originating node in a wireless network comprising several nodes wirelessly connected to each other, wherein the originating node is enabling selection of a transmission path from the originating node to a target node, wherein there are at least two possible transmission paths between the originating node and the target node. The originating node is configured to cause the originating node to receive discovery signals from nodes in the at least two possible transmission paths, to estimate, based on the received discovery signals, radio channels H for transmission from the originating node to the nodes transmitting the discovery signals and to calculate, for different transmission modes, based on the estimated radio channels, metrics of links from the originating node to the nodes transmitting the discovery signals, wherein at least one of the transmission modes involves simultaneous transmission from the originating node to at least two of the nodes transmitting the discovery signals and to transmit the calculated metrics to an adjacent node. The disclosure also relates to a corresponding computer program in an originating node.

According to some aspects, the disclosure relates to a method, performed in a target node in a wireless network comprising several nodes wirelessly connected to each other, for selecting a path for transmission from an originating node to the target node, wherein there are at least two possible transmission paths between the originating node and the target node. The method comprises the steps of receiving from nodes in the at least two possible transmission paths, for different transmission modes, metrics of links in transmission paths from the originating node to the nodes transmitting the metrics, wherein at least one of the transmission modes involves simultaneous transmission from the originating node to at least two of the nodes and estimating, radio channels H for transmission from the nodes transmitting the metrics to the target node. The method further comprises calculating, based on the estimated radio channels H, metrics of links from the nodes, transmitting the metrics, to the target node, and selecting at least one transmission path to use for transmission from the originating node to the target node, by calculating and comparing accumulated path metrics from the originating node to the target node of the different transmission modes, based on the received and calculated metrics, for the different transmission modes.

According to some aspects, the estimating comprises estimating the radio channels using a Path Request, PREQ. According to some aspects, the method comprises, selecting transmission properties corresponding to the at least one selected transmission path. If for example, some time/frequency resources are better for one node whereas others are better for another node, the originating node may take advantage of this fact when selecting a particular path. Hence, according to some aspects, the proposed technique enables that the link is selected to take advantage to the environment.

According to some aspects, the method further comprises transmitting a path reply, PREP, indicative of the selected transmission path. According to some aspects, the method further comprises receiving discovery signals from nodes in the at least two possible transmission paths and then the estimating, is based on the received discovery signals.

According to some aspects, the disclosure relates to a target node in a wireless network comprising several nodes wirelessly connected to each other, wherein the target node is configured to select a transmission path from the originating node to a target node, wherein there are at least two possible transmission paths between an originating node and the target node. The target node is configured to cause the target node to receive from nodes in the at least two possible transmission paths, for different transmission modes, metrics of links in transmission paths from the originating node to the nodes transmitting the metrics, wherein at least one of the transmission modes involves simultaneous transmission from the originating node to at least two of the nodes, to estimate, radio channels for transmission from the respective nodes transmitting the metrics to the target node, to calculate, based on the estimated radio channels, metrics of links from the nodes transmitting the metrics, to the target node, and to select at least one transmission path to use for transmission from the originating node to the target node, by calculating and comparing accumulated path metrics from the originating node to the target node of the different transmission modes, based on the received and calculated metrics, for the different transmission modes.

According to some aspects of the disclosure, it provides for a computer program, comprising computer readable code which, when run on a target node, causes the node to perform the method according to above.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

DETAILED DESCRIPTION

Figure 1A:
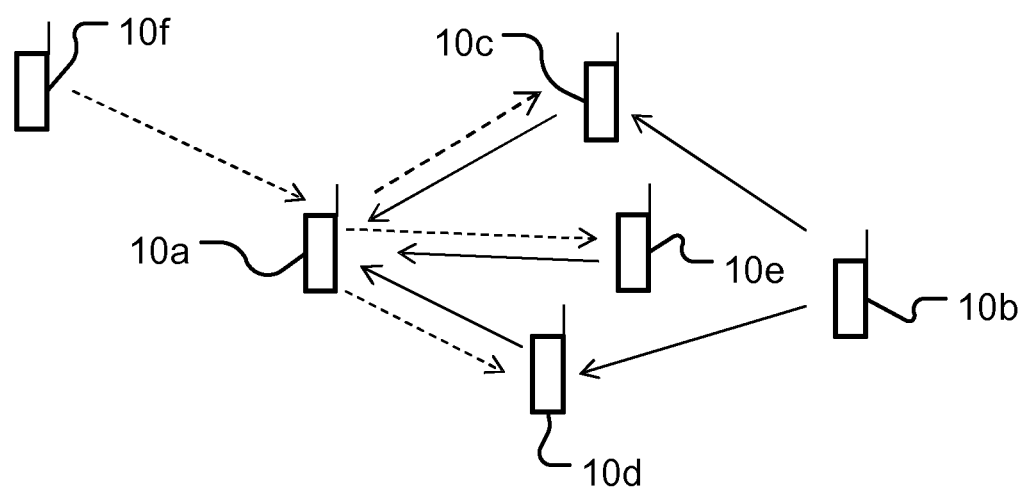
FIG. 1a illustrates a wireless mesh network.

Aspects of the present disclosure will be described more fully hereinafter with reference to the accompanying drawings. The nodes and methods disclosed herein can, however, be realized in many different forms and should not be construed as being limited to the aspects set forth herein. Like numbers in the drawings refer to like elements throughout.

Definitions

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In general, routing can be defined as the act of moving information from a source node to a target node via one or more intermediate nodes in a communication network. In a multi-hop network, nodes out of reach from each other may benefit from intermediately located nodes that can forward their messages from the source towards the target.

A path or route connects two nodes in a network. In a multi-hop network a path comprises a sequence of links and nodes. The path is defined by the properties of the links such as bit-rate or latency. The path may as well be affected by the properties of the nodes. The original source in a path is commonly referred to as a source node. The final target in a path is a target node. For every link in a mesh network, a transmitting node is a transmitter node and the receiving node is a receiver node.

This disclosure sometimes refers to an originating node. The originating node may be the source node, but in some embodiments the proposed methods may be implemented within a path in a network. Then the originating node is a relay node.

This disclosure sometimes refers to a target node. The target node may be the destination node, but in some embodiments the proposed methods may be implemented within a path in a network. Then the target node is a relay node.

Routing generally involves two basic tasks; determining or selecting suitable routing paths and transporting information through the network. In the context of the routing process, the first of these tasks is normally referred to as route determination and the latter of these tasks is often referred to as packet forwarding.

In wired systems where typically the bit error rates are negligible and any collisions are immediately detected upon transmission, resulting in a fixed per-link routing cost, routing is performed on the IP level, using IP addresses. Wireless routing, on the other hand, differs from wired in that wireless channels are significantly less reliable and more variable. The cost of routing a packet through a certain link is no longer constant but instead depending on the channel between the nodes. In order to optimize performance with respect to either sparse radio spectrum resources, and/or packet latency, routing is performed on a lower layer where knowledge of the wireless channel properties exists. In its simplest form, knowledge of a successful transmission of a packet along the route is obtained by the receiver transmitting an Acknowledgement message, ACK, back to the transmitter.

Path Setup for Single Path Routing

Path setup for single path routing in wireless mesh networks is well known in the art. A general example of path setup for single path routing will now be described.

Routing in a mesh networks implies that a message propagates from a source node to a target node along a path, by hopping, or being transmitted or relayed, from node to node until the target node is reached. Every node holds a path table or routing table comprising information about the path metrics to other nodes in the wireless network. A metric defines a cost in terms of time and/or frequency and/or code resources required for transmission of data on the link. Air Time Link Metric, ATLM is one example of a link metric used in wireless mesh networks. Code here refers to spread spectrum systems.

When a source S wants to communicate with target D, it looks in its path table. In case S does not find the desired target D, it may send out a Path Request, PREQ, identifying the desired target, to its neighbor nodes. The PREQ is typically broadcasted to all nodes in the network, but of course only the closest ones can hear it directly. The PREQ may require a Path Reply, PREP. In contrast to PREQs, PREPs are not flooded in the network, but are targeted to the originator of the PREQ. In other words each PREP is targeted to a node in the selected path between S and D.

When the source receives the PREQ will respond with a PREP that establishes one or more reverse path to the source S and the information about the corresponding peer nodes of the source, i.e. the sender of the PREQ. The PREQ may specify that every intermediate node that knows the path to the target of the PREQ may also respond with a PREP.

PREQs may be sent on-demand as described above, but they may also be sent pro-actively at network set-up in order to update the path tables for all nodes. In such a PREQ the target may be set to an unspecified value, Implying that any node receiving the PREQ will respond with own node was the target.

Path Setup for Multi Path Routing

The present disclosure proposes a method for setting up paths from a source node, via one or more intermediary nodes, to a target node, where data may be transmitted in parallel over said paths. Hence, the disclosure relates to setting up paths in order to utilize the diversity gain arising from utilizing two or more paths. The main principle involves including information about path metrics for different transmission alternatives in the path requests. For example a path request may include metrics for transmission via a first intermediate node, via a second intermediate node and via both the first and second intermediate nodes, using some kind of multipath transmission.

For better understanding of the proposed technique, the dual path concept will now be briefly introduced.

FIG. 2 illustrates a scenario, when a data packet A+B is to be transmitted. However, in order to achieve the required quality encoding is required, which implies that the encoded packet size would be above the supported packet size. If using a single path, the packet may then have to be retransmitted or fragmented into smaller packets that would be subsequently transmitted, which would cause delays. However, this problem may be avoided by using multiple paths as discussed above.

Figure 2A:
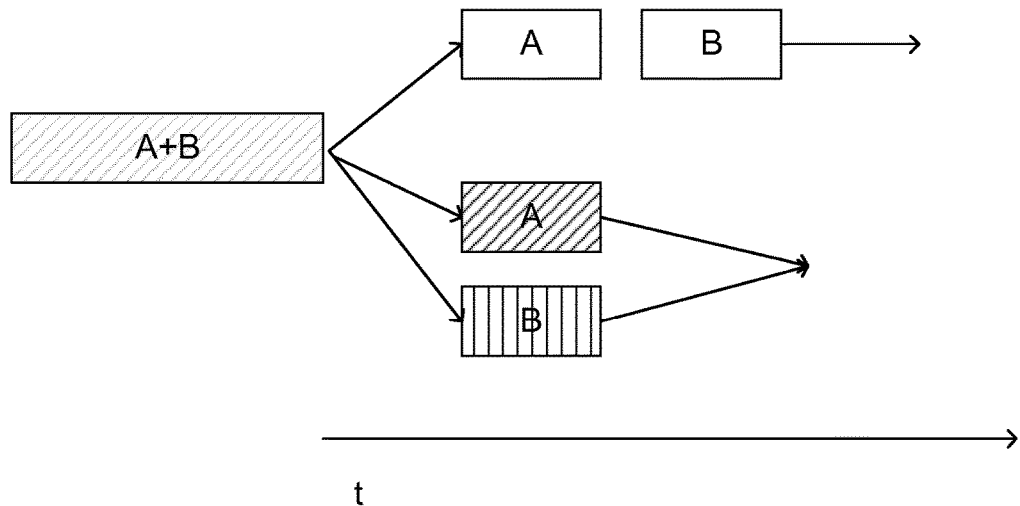
FIG. 2a illustrates the time consumption of sending a packet split into sub packets over different transmission paths compared to sending them over the same transmission path.
Figure 2B:
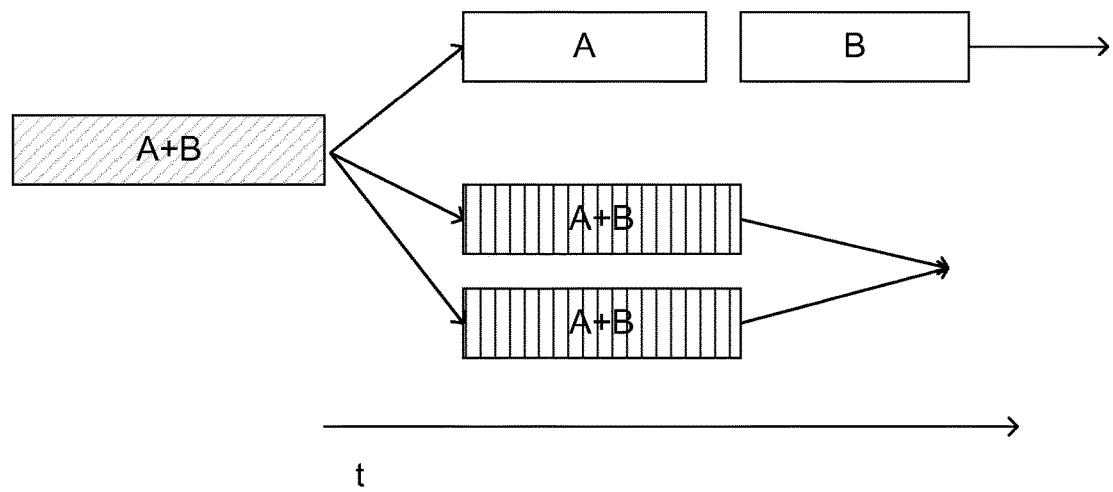
FIG. 2b illustrates the time consumption of sending a copied packet over different transmission paths compared to sending a split packet over the same transmission paths.

In FIG. 2a the data packet A+B is split into two fragments, or sub packets, A, B that are transmitted over different transmission paths. In FIG. 2b the original data packet A+B is transmitted two times over different paths, even though the channel quality is low. However, at the receiver side the data from the two transmissions may be combined in order to maintain quality.

In order to be able to transmit the sub packets approximately simultaneously, the different transmissions, i.e. the transmissions of the different sub packets needs to be separated, such that the signals do not interfere (too much). The separation may be done in time, frequency or in the spatial domain. Using different physical resources in the time domain implies for example Time Division Multiplexing, TDM. Separation in time here refers to multiplexing the data over a frequency channel in time, by splitting a channel into different time slots to enable different transmitters to transmit on the same frequency. By transmitting the data belonging to different transmission paths on different timeslots, the packet may be transmitted to different receiving nodes. This may improve efficiency e.g. if the number of time slots that may be allocated to one transmitter is limited. For example, the originating node chooses to transmit sub packets, originating from the same data packet, to different intermediate nodes in different time slots. Then the intermediate nodes may forward the data packet to the target node in a synchronized manner. Using different physical resources in the frequency domain implies for example Frequency Division Multiplexing, FDM. TDM and/or FDM are e.g. used if different parts of a network have different channel quality. For example, if a first set of Resource Blocks, RB, here called X, have good signal quality versus one intermediate node, while other RBs, here called Y, have better quality versus another intermediate node. Then data is scheduled on X to the first intermediate node and on Y to the other intermediate node. The intermediate nodes may be exposed to this situation to different degrees. Hence, different resources may be useful to one node while not useful or less useful to another.

Similarly as in the TDM case, when using FDM an originating node may transmit sub packets, originating from the same data packet, to different intermediate nodes on different frequencies. The intermediate nodes may then forward the sub packets in a synchronized manner, and possibly even on the same frequency, depending on how sub packets are designed.

Figure 3A:
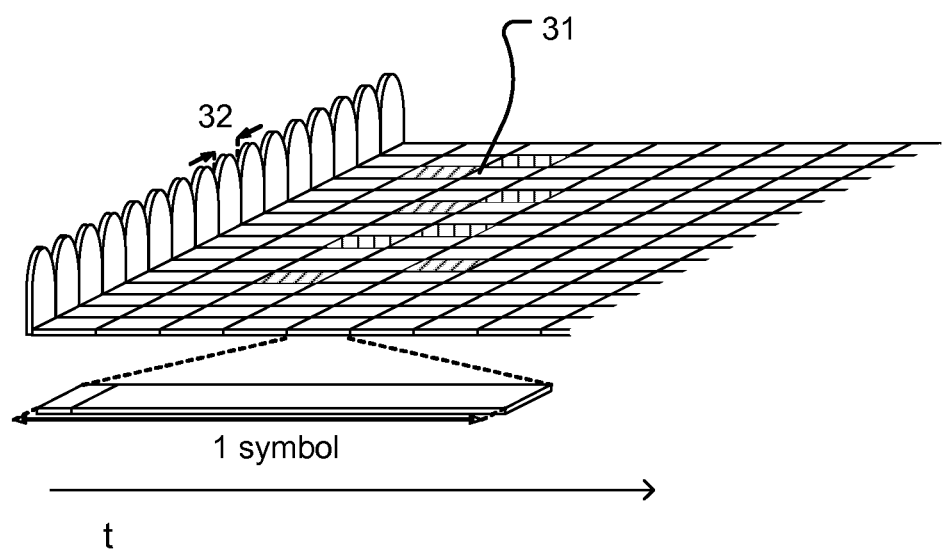
FIG. 3a illustrates sending a sub packet using different physical resources in the time and frequency domain.

LTE uses Orthogonal Frequency Division Multiplexing, OFDM, in the downlink and Discrete Fourier Transform, DFT; —spread OFDM (a.k.a. single carrier FDMA, SC-FDMA) in the uplink. The basic LTE downlink physical resource can thus be seen as a time-frequency grid as illustrated in FIG. 3a, where each resource element 31 corresponds to one OFDM subcarrier 32 in the frequency domain during one OFDM symbol interval in the time domain. Furthermore, the resource allocation in LTE is typically described in terms of resource blocks, RB, where a resource block corresponds to one slot (0.5 ms) in the time domain and 12 contiguous subcarriers in the frequency domain. Resource blocks are numbered in the frequency domain, starting with 0 from one end of the system bandwidth.

For separation in the spatial domain the node utilizes for example precoding matrixes for beamforming and/or MIMO. This requires multiple antennas at the transmitter and receiver nodes, otherwise spatial separation of the signal or parallel streams is not possible. This alternative is useful when the substantially the same coding and modulation may be used for transmission on the different paths.

Figure 3B:
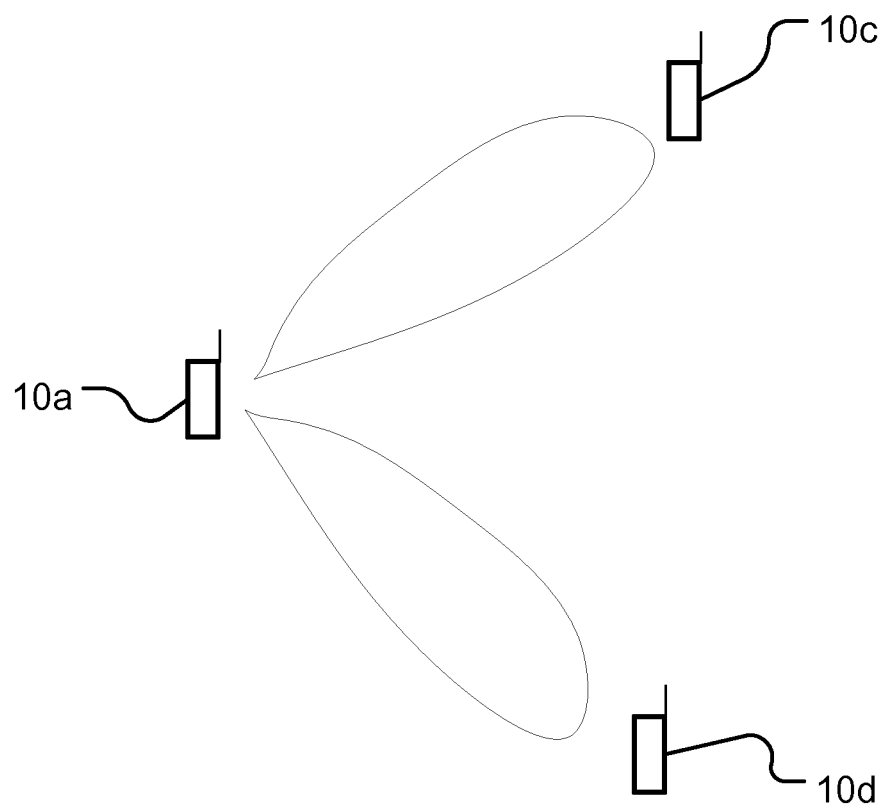
FIG. 3b illustrates sending a sub packet using different physical resources in the spatial domain.

FIG. 3b illustrates a MIMO transmission performed by a wireless device 10a. In this case the wireless device comprises a Multiple Input and Multiple Output, MIMO, antenna configuration. Data packets are transmitted in parallel on the same frequency channel by using different precoding matrixes or antennas. In conventional MIMO both the transmitter and the receiver has multiple antennas and a signal is split in the transmitter and sent over several antennas and received in the receiver with several antennas. In a MIMO system a channel layer e.g. corresponds to one of the k transmitter antenna ports. An antenna port is a logical term which is generally used as a generic term for signal transmission under identical channel conditions. Separate reference signals (pilot signals) that are suitable for estimating the respective channel are defined in the LTE standard for each antenna port.

In the case illustrated in FIG. 3b, spatial separation is used in the transmitter 10a for transmitting the packet to two different receiving nodes 10c, 10d. However, if the receiving nodes then transmit the signal to a fourth node in a synchronized manner, the fourth receiving node may treat the signal as a MIMO transmission. In other words, a MIMO transmission is performed from the transmitter and the receiver's point of view but there are intermediate nodes which pass on the signal. The intermediate node also does some multiplication with a precoding matrix of its own. This is because the beamforming and/or MIMO channels between the originating node and the intermediate node are different from the beamforming and/or MIMO channels between the intermediate node and the second node.

Hence, by using multi path transmission on a physical layer i.e. radio layer, efficient transmission from a source node to a target node may be achieved. However, the prior art path setup for single path is not fully compatible with the multi path case, because the nodes in one path does not hold information about the transmissions in the other paths. Therefore, this disclosure presents an improved protocol for path setup, where estimated metrics of links for a transmission (in particular corresponding to multipath transmissions) are not calculated by the receiver node, but are instead included in the PREQ. One main difference is that the metrics for links from a source node are not estimated by the receiver node, but are estimated by the transmitter node.

The proposed technology is generally applicable to any wireless routing protocol, independent of implementation, including both distributed and centralized routing algorithms, hop-by-hop routing as well as source-routing, link-state routing and distance-vector routing, proactive or reactive routing, flat or hierarchical routing and multi-path routing, as well as variations and combinations thereof. As part of the development of the example embodiments presented herein, a problem will first be identified and discussed.

An introduction to the proposed technique will now be given referring to FIG. 1b. Assume that an originating, or source, node N_s has data to transmit data to a target, or destination, node N_d. Between nodes N_s and N_d there are two intermediate nodes N_i1 and N_i2. N_s knows in advance, from receiving discovery signals transmitted by the respective nodes, the channel estimates H_si1, H_si2 to nodes N_i1 and N_i2, respectively. By performing an exhaustive search, or by some other method, N_s then computes the mutual information, MI, for all possible combinations of channel layers, to node N_i1 and node N_i2, respectively, with other channels acting as interferers, in order to derive the highest MIs, implying the channels that are most suitable for multipath signaling. Mutual information is one of many quantities that measure how much information one random variable (i.e., the transmitted signal) shares with another random variable (i.e., the receiver signal). Basically a channel's MI indicates how much information it is possible to transmit over said channel.

Having identified the channel combinations of H_si1 and H_si2 that produces the best transmission conditions (in terms of a channel quality measure such as mutual information or any channel quality measure such as signal-to-interference-and-noise-ratio, SINR), node N_s includes these in the PREQ that it is constructing for transmission, together with their respective path metrics. Hence, the PREQ may e.g. comprise path metrics and related transmission information for two single paths and one or more multi paths.

Upon receiving node N_s's PREQ for N_d, node N_i1 looks up node N_d in its path table. Assuming that no entry exists, and then node N_i1 forwards the PREQ after updating its cost metric by the link between node N_s and N_i1. The corresponding activity takes place in node N_i2.

In turn, when node N_d receives the PREQs from both node N_i1 and node N_i2, it will compare the single SINRs or MIs and path metrics of both node N_i1 and node N_i2, and also compute the SINRs and MIs of all combinations (i.e. multi path transmissions) of the channels H_i1d and H_i2d, respectively, and the corresponding path metric for these, in order to identify the path with the optimal link metric. In this example, this time the optimal path metric is the one by a MU-MIMO transmission with both nodes N_i1 and N_i2 acting as relays. Node N_d then transmits a PREP to both node N_i1 and node N_i2, respectively, identifying the optimal MCS, rank etc. for both N_i1 and N_i2, respectively, based on the received a priori and computed SINRs, MIs and link metrics.

Upon receiving the PREP, node N_i1 takes note of the required settings and then relays the PREP to node N_s. The corresponding activities take place in node N_i2.

Finally, node N_s receives the PREP and may start transmitting data according to the specified scheme. This path setup method will thus enable path selection, which also includes selecting multiple paths for connecting the originating node with the target node. The multi path alternative may offer a better routing alternative than the single paths, thereby allowing for higher throughput and/or lower packet error rates and/or lower end-to-end latency etc.

MIMO Channel Characterization

The channel calculations in the example above will now be further explained, for better understanding the effects of the invention. For the MU-MIMO case, the channel matrices $H_{si1}$ and $H_{si2}$, between nodes N_s and N_i1 and N_i2, respectively, may each be expressed as, using singular value decomposition, $$H = U\Lambda V^H$$

where $\Lambda$ is a diagonal matrix with the singular values in the diagonal elements representing the power of each of the parallel MIMO sub channels, and U and V are unitary rotation matrices representing the optimal post- and precoding matrices, respectively, well known in the art. From $\Lambda_1$ and $\Lambda_2$ the K and L largest singular values are chosen such that $K+L \leq R_{max}$ where $R_{max}$ represents the maximum rank, i.e., the number of receiver antennas, together with their respective pre- and postcoding matrices are selected. For the MU-MIMO case, the channel matrix H is e.g., composed of combinations of channels from node N_s to both node N_i1 and node N_i2, respectively, $$\Lambda = \mathrm{diag}([\lambda_{1,1} \ldots \lambda_{1,K} \lambda_{2,1} \ldots \lambda_{2,L}])$$

$$U = [u_{1,1} \ldots u_{1,K} u_{2,1} \ldots u_{2,L}]$$

$$V = \begin{bmatrix} v_{1,1} \\ \vdots \\ v_{1,K} \\ v_{2,1} \\ \vdots \\ v_{2,L} \end{bmatrix}$$

where $\lambda_{i,j}$ is the jth singular value for the ith relay node and $u_{i,j}$ and $v_{i,j}$ is the jth row and column vector for the ith relay node for matrices U and V, respectively.

Having identified the optimal sub channels 1,K and 1,L, respectively, resulting in maximum rank, the Signal to Interference and Noise Ratio, SINR, is computed for each subchannel h in H according to $$SINR = h(C + HH^H - hh^H)^{-1}h$$

where h is the effective channel response for the desired sub channel, C is the noise covariance matrix and H is the channel response of all channels. Having derived the SINR, it is a commonly known procedure to compute the ATLM for the link as well as for the total channel, assuming a fixed packet size and packet error rate.

Furthermore, knowing the SINR, derivations of the mutual information, MI, and capacity, C, is well known in the art. For example, capacity may be expressed as, using B as the channel bandwidth, $$C = B \log_2(1 + SINR)$$

and, with T representing a period of time, $$MI = CT.$$

Using MI or C it is possible to calculate an aggregated MI or C from the different layers of the MIMO transmission, and then to reversely calculate an equivalent Single Input Single Output-Signal to Noise Ratio, SISO-SINR and SISO-ATLM.

Example Operations in an Originating Node

Figure 1B:
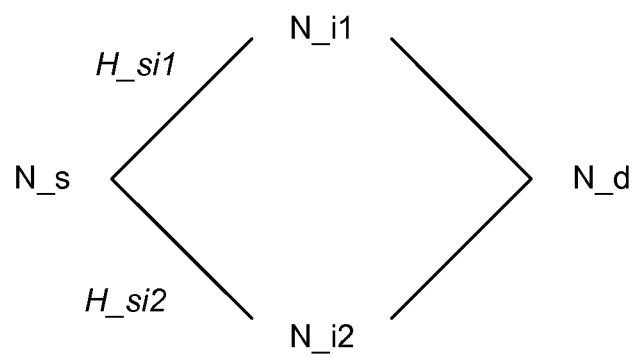
FIG. 1b illustrates a mesh network with four nodes.

The meshed wireless network of FIG. 1a will now be used as an example of a wireless network, wherein the proposed methods may be implemented. The meshed network comprises a number of wireless nodes 10a to 10e wirelessly connected to each other, being a subset of all nodes in an ad hoc or mesh network. In this example the nodes are user equipments, UE, but the same principle could be applied to any wireless network comprising wirelessly connected nodes.

In the network, packets may be delivered from an originating node 10a to a target node 10b. The originating node 10a may be a source node. However, the packets may also be arriving from another node 10f, which would then be the source node. In FIG. 1a, the originating node 10a need to choose a route to the target node 10b via intermediate nodes 10c, 10d or 10e. According to this example, which illustrates the proposed technique, the originating node 10a chooses a combination of two or three routes for simultaneous transmissions of sub packets to the target node 10b.

Figure 4:
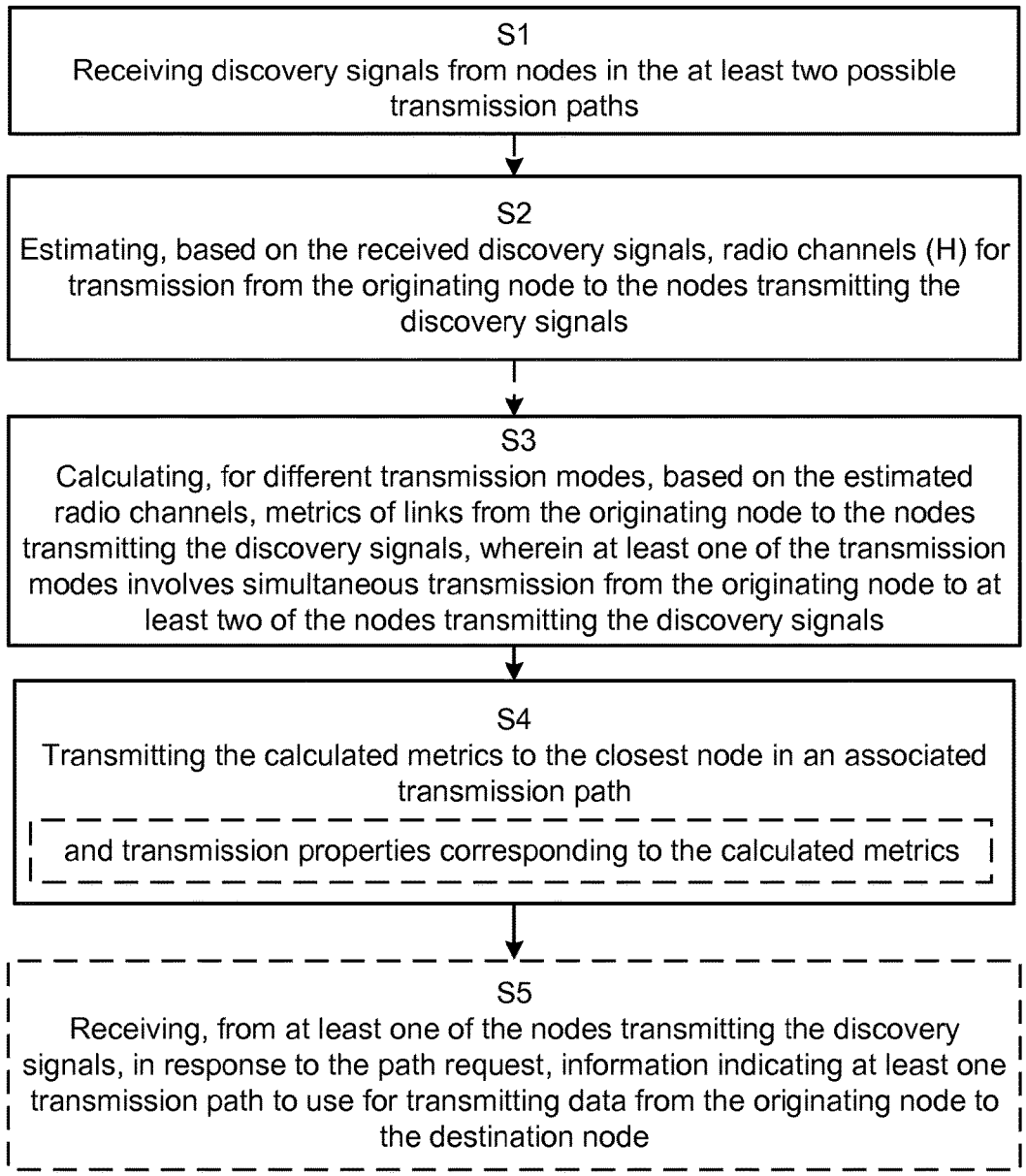
FIG. 4 is a flow chart illustrating the proposed method, performed in an originating node.

FIG. 4 is a flow diagram depicting example operations which may be performed in a originating node 10a in a wireless network comprising several nodes 10a-e wirelessly connected to each other, for enabling selection of a transmission path from the originating node 10a to a target node 10b, when there are at least two possible transmission paths between the originating node and the target node. The proposed method may be performed at any point in time when path setup is desired. Hence, the proposed methods may either be performed pro-actively or on demand.

It should be appreciated that FIG. 4 comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

In a reactive mesh network using on-demand path setup, the path setup is done at the instant when 10a has data to transmit by 10a transmitting a path request, PREQ, to its neighbors.

In order for node 10a to transmit data to 10b, assuming there is no direct link between 10a and 10b, or that the direct link between the nodes is too weak, 10a needs to identify which path(s) to use for the transmission. If 10a has previously been transmitting to 10b, or vice versa, it may have an current transmission setup in its path table, otherwise 10a must find one or more paths to 10b via the intermediary nodes 10c, 10d and 10e and also decide which of 10c, 10d and 10e it should use as an intermediary node, or if it should use more of these nodes as intermediary nodes. Basically it could be either two or all three of the nodes that are used. The node limit is min(N_tx, N_rx) i.e., the minimum of transmitter and receiver antennas.

Nodes in the wireless network, that want to communicate with other nodes, or even just discover other nodes, typically need to transmit various forms of control signaling. One example of such control signaling is the so-called discovery message or beacon, which at least carries some form of identity and is transmitted by any node that wants to be discoverable by other nodes. Other nodes can scan for the discovery signal holding the message. Once the neighbor nodes have detected the discovery message, they can take the appropriate action, for example to try to initiate a connection setup with the node transmitting the discovery message. These discovery messages may also be used by the nodes receiving the signals in order to estimate the channel. In this way, the network can estimate the downlink channel to multiple nodes at the same time, assuming reciprocity which is reasonable in a TDD system with similar node surroundings.

Returning to FIG. 4, the proposed method comprises receiving S1 discovery signals from nodes 10c, 10d, 10e in the at least two possible transmission paths. Typically the originating node receives beacons from other nodes in its vicinity that are considered as possible relay nodes for transmissions from the originating node 10a. In principle any signal from respective transmitter could serve as a discovery signal, as long as the signal includes pilots, i.e. known symbols. Discovery signals are the ones most suitable since they are generally periodic. The discovery signals also may contain information about the channel quality of the node, i.e., time-frequency information about resource pollution at said node. This data would be used for the option of splitting data w.r.t. time or frequency resources.

The originating node 10a may receive discovery signals from neighbor nodes, but also from nodes located further away. The source node 10a may in principle receive a discovery signal from the target node 10b. Discovery signals are usually short, which implies that they have an increase range relative data packets that are usually much longer.

The proposed method comprises estimating S2, based on the received discovery signals, radio channels H for transmission from the originating node to the nodes transmitting the discovery signals 10c, 10d, 10e. Hence, by measuring on the discovery signals or beacons it is possible for the originating node 10a to compute an a priori MU-MIMO link metric such as the ATLM between the transmitting 10a and the jointly receiving 10c and 10d. The channel is typically represented using an impulse response model. In signal processing, the impulse response, or impulse response function (IRF), of a dynamic system is its output when presented with a brief input signal, called an impulse. More generally, an impulse response refers to the reaction of any dynamic system in response to some external change. In a MIMO system, the channel for all the layers may be modelled by a channel matrix H. H is the channel matrix comprised of the channels between all the combinations of the individual transmitter and receiver antenna elements. For the assumed reciprocity the channel is actually transposed at some point since we measure it in the "reverse" direction.

The method further comprises calculating S3, for different transmission modes, based on the estimated radio channels, metrics of links from the originating node to the nodes transmitting the discovery signals 10c, 10d, 10e. The metrics defines a cost in terms of time and/or frequency and/or code resources required for transmission of data on the links of a transmission mode. A transmission mode refers to the type of transmission on a physical layer level. For example whether the transmission from 10a is a unicast to one node or a multicast transmission to several nodes, and what type of transmission properties such as modulation and coding scheme are used.

In accordance with the proposed technique, at least one of the transmission modes involves simultaneous transmission from the originating node to at least two of the nodes transmitting the discovery signals 10c, 10d, 10e, as discussed in relation to FIGS. 2 and 3. The possible receiver node combinations for MU-MIMO, are decided by the channel properties to the respective receiver nodes in order to optimize transmission rank.

The method further comprises transmitting S4 the calculated metrics to an adjacent node. Typically the recipient is the closest node in an associated possible transmission path. This may be achieved by including the calculate path metrics in a path request, PREQ. In other words, the information included in the PREQ, identifies different transmission alternatives as well as corresponding link metric. One such alternative would be a single path transmission via node 10c as well as the link metric for a link between node 10a and 10c using four parallel streams i.e. channel layers. Another alternative would be a multi path transmission via both node 10c and node 10d as well as the link metric for a link between nodes 10a and 10c using two parallel streams corresponding to a joint transmission from nodes 10a and 10d which is also using two parallel streams, and vice versa.

The PREQ may include a joint MU-MIMO link metric for as many nodes as the number of layers in 10a, as well as for several combinations of relay node and layer combinations. The PREQ, possibly also includes information regarding what kind of network optimization is preferred with respect to the coming traffic, e.g. throughput, latency or packet error rate.

According to some aspects the step of transmitting S4 comprises transmitting, for the different transmission modes, or transmission properties corresponding to the calculated metrics. Transmission properties are e.g. time/frequency resources, modulation and coding scheme, Multiple-input-multiple-output, MIMO, scheme, rank and/or precoding matrix. Transmission properties generally relate to radio i.e. layer one or physical layer, properties. In other words, by including further transmission information in the PREQ, the network is enabled to make appropriate optimizations with respect to e.g., throughput, latency, packet error rate, system load and/or resource utilization.

According to some aspects, the transmission mode implies a duplex transmission to at least two nodes, wherein data is split over different time/frequency resources to the respective nodes and wherein the transmission mode defines which time/frequency resources to use for each respective link. Hence, if some time/frequency resources are better for one node whereas others are better for another node, then the originating node may take advantage of this fact when selecting the path. Hence, according to some aspects, the proposed technique enables that the path or link is selected to take advantage to the environment.

When node 10a transmits a PREQ it will be received by both node 10c and to node 10d, which, in turn, will try looking up a current path setup in its path table, or rebroadcast the PREQ in order to find a path to node 10b. Included in the PREQ of nodes 10c and node 10d is now multiple accumulated path metrics; one for each of the single paths 10a-10j-10b (for j=c,d) and one for the multipath 10a-10c, 10d-10b.

When node 10b receives a set of PREQs, it will compute accumulated path metrics e.g., ATLM, or another path metric based on e.g., the previous path metric of the PREQs including the a priori path metrics, and metadata such as link signal strength, number of relays, or channel characteristics from nodes 10c and 10d, respectively, and the estimated SINR gain relative other nodes from which it also has received PREQs. In accordance with the proposed technique, this computation, also involves the channel matrix estimates between, on one hand node 10b, and, on the other hand, nodes 10c and 10d, respectively, in order to assess the ability to separate the two channels, between nodes 10b and 10c and between nodes 10b and 10d, respectively.

The metric may also be computed on a sub band level in order to take into account the effects of frequency selective fading. Based on the computed metric for the different transmission alternatives, node 10b then selects the transmission alternative corresponding to the best metric. Such different transmission alternatives are in this disclosure referred to as different transmission modes.

Hence, examples of possible transmission modes in node 10b are:
 a) MU-MIMO transmission from both node 10c and 10d in which different data streams are allocated to 10c and 10d, respectively.
 b) Duplex transmission in which data is split on nodes 10c and 10d using different time and or frequency resources.
 c) Diversity transmission where nodes 10c and 10d shares the same data and resources in a CoMP (Coordinated MultiPoint) fashion.
 d) SU-MIMO transmission from either node 10c or 10d.

When the target node 10b receives the PREQ, it will transmit a response, including a selected transmission mode, to either one of nodes 10c and 10d, from which it has received a PREQ, or to both of them, depending on the selected transmission alternative. Upon receiving the response, node 10c takes note of the required settings and then relays the response to node 10a. The corresponding activities take place in node 10d. Hence, in this example, nodes 10c and 10d act as relay nodes. Finally, node 10a receives the response and may start transmitting data according to the scheme specified in the response.

Hence, according to some aspects, the method further comprises receiving S5, from at least one of the nodes 10c, 10d, 10e, that are transmitting the discovery signals, in response to the path request, information indicating at least one transmission path to use for transmitting data from the originating node to the target node. According to some aspects, the received information is comprised in a Path Reply, PREP. The PREP will be discussed in more detail below, when presenting the proposed method in a target node.

Figure 5:
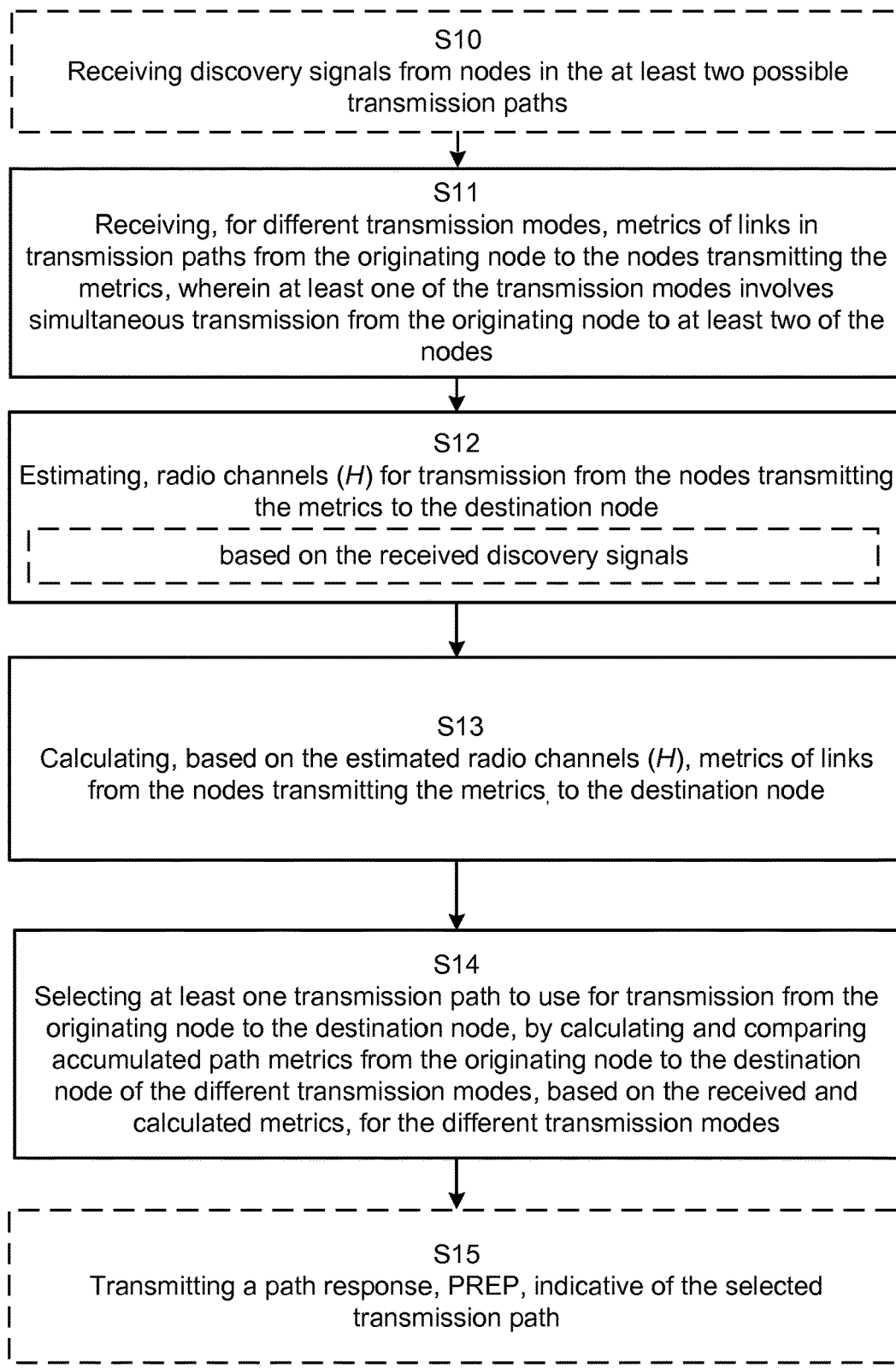
FIG. 5 is a flow chart illustrating the proposed method, performed in a target node.

The method performed in a target node will now be described referring to FIG. 5. FIG. 5 illustrates a method, performed in a target node 10b in a wireless network comprising several nodes 10a-e wirelessly connected to each other, for selecting a path for transmission from an originating node 10a to the target node 10b, wherein there are at least two possible transmission paths between the originating node and the target node.

It should be appreciated that FIG. 5 comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

The method is performed in a target node 10b, when receiving a request for a path from an originating node in a wireless network, to which the target node 10b is connected. In other words, the method comprises receiving S11 from nodes 10c, 10d, 10e in the at least two possible transmission paths, for different transmission modes, metrics of links in transmission paths from the originating node to the nodes 10c, 10d, 10e transmitting the metrics. The received metrics may be accumulated path metrics of several links. In accordance with the proposed technique, at least one of the transmission modes involves simultaneous transmission from the originating node to at least two of the nodes 10c, 10d, 10e.

According to some aspects, the received metric is comprised in a path request PREQ. This PREQ is basically a forwarded PREQ. In other words, the relay nodes 10c, 10d have received PREQ:s, with target node being 10b, from 10a and now forwards the PREQ:s to the target node 10b.

In order to calculate the complete path from the originating node 10a, the target node, needs to also estimate the path from the node sending the forwarded PREQ:s. Hence, the method further comprises estimating S12, radio channels H for transmission from the nodes 10c, 10d, 10e transmitting the metrics to the target node. The channel may be estimated using the actual PREQ message.

Alternatively, the channel estimation may be done using the discovery signals or beacons transmitted by the relay nodes 10c, 10d. Hence, according to some aspects, the method further comprises receiving S10 discovery signals from nodes in the at least two possible transmission paths. Then, the estimating S12 is based on the received discovery signals.

When the channel is estimated, the metric for the link, or links, between the target node 10b and the node forwarding the PREQ can be calculated. Hence, the method further comprises calculating S13, based on the estimated radio channels (H), metrics of links from the nodes 10c, 10d, 10e transmitting the metrics, to the target node.

The target node now has knowledge about the link to the intermediate or relay nodes 10c, 10d and the links from the relay nodes 10c and 10d. Or in other words from source node to relay nodes and from relay nodes to target node. By adding the metrics the total paths for different transmission alternatives may be calculated. Hence, the method further comprises selecting S14 at least one transmission path to use for transmission from the originating node to the target node, by calculating and comparing accumulated path metrics from the originating node to the target node of the different transmission modes, based on the received and calculated metrics, for the different transmission modes.

When a path is selected, the originating node needs to be informed about the selected transmission path. According to some aspects, the method further comprises transmitting S15 a response indicative of the selected transmission path. According to some aspects, the response is a Path Reply, PREP. In other words, the PREP also includes information defining the settings of simultaneous transmissions in a transmission mode that uses multipath transmission.

For all the aspects of this disclosure, Channel State Information, CSI, regarding MCS, rank and precoding may also be included in the PREP in order instruct nodes 10c and 10d regarding which CSI settings to use for optimal reception at node 10b.

Assuming that multipath transmission is chosen, then the originating node 10a will receive the path reply (PREP) from both node 10c and from node 10d and is thus able to start transmitting data in parallel, or redundantly, over both node 10c and node 10d as defined in the PREP. Examples of such transmissions from node 10a are; a MU-MIMO transmission, in which nodes 10c and 10d will share the available resources, a duplex transmission in which nodes 10c and 10d will split the available resources or a unicast SU-MIMO transmission to either node 10c or 10d.

Since 10a is the sole transmitter node initially and wherein the PREP is only available in this node initially, it is not possible to initiate a transmit diversity transmission (alternative c) above), where the same data and resources are shared in a CoMP fashion, at this time. However, by transmitting the same data to intermediate or relay nodes 10c and 10d, transmit diversity may still be accomplished at the receiver side.

It important to realize that, what has above been described as different nodes, 10a, 10b, 10c and 10d, may in fact be the same node N in different modes of operation. Sometimes a node N may act as an originating node 10a, at other times as an intermediate node 10c or 10d and at yet other times as a target node 10b. Furthermore, the above is not limited to any number of intermediary nodes, or any number of links in the path.

Example Node Configurations

Figure 6A:
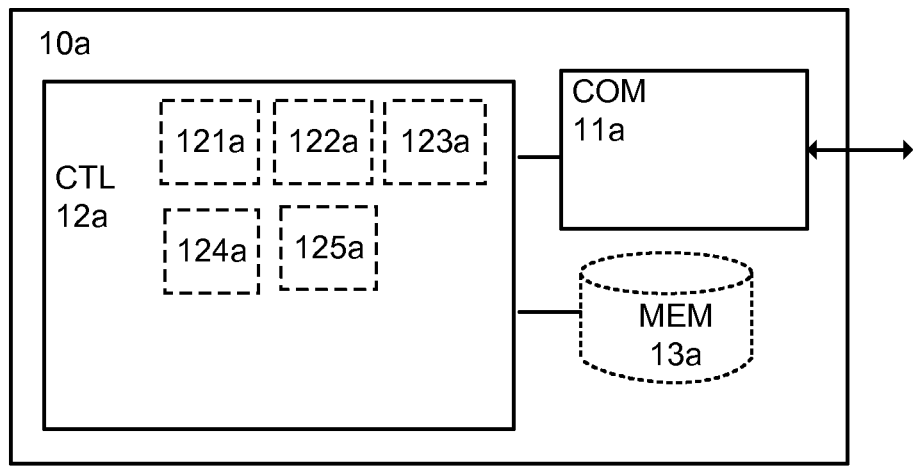
FIG. 6a is a schematic diagram illustrating an originating node.

FIG. 6a illustrates an example node configuration of an originating node 10a, in a wireless network comprising several nodes 10a-e wirelessly connected to each other, wherein the originating node is enabling selection of a transmission path from the originating node 10a to a target node 10b, wherein there are at least two possible transmission paths between the originating node and the target node According to some aspects, the originating node is a wireless device or network node. In some embodiments the wireless node is the source of data packet (for instance originated on application level in the wireless node). In other embodiments, the wireless node is a network node where data packet may have been received via a wired backhaul. It may just as well be the other way around, that the target node is connected, or actually that both nodes are connected to an external wired or wireless network. The proposed methods may e.g. be implemented in a sensor network where the information flow is from one or several sensors to a server on the internet. In another embodiment the wireless node receives the data packet from another wireless node 10f. The originating node determines the target for the data packet, typically by reading an address in a packet header associated to the target destination/node.

As shown in FIG. 6a, the originating node 10a comprises a communication interface or radio circuitry 11a including antennas, configured to receive and transmit any form of communications or control signals within a network. In other words, the originating node comprises a communication interface 11a configured for wireless communication with other nodes 10b-e in the wireless network. It should be appreciated that the radio circuitry 11a according to some aspects comprises any number of transceiving, receiving, and/or transmitting units or circuitry. It should further be appreciated that the radio circuitry 11a may be in the form of any input/output communications port known in the art. The radio circuitry 11a according to some aspects comprises RF circuitry and baseband processing circuitry (not shown).

The originating node 10a, according to some aspects, further comprises at least one memory unit or circuitry 13a that may be in communication with the radio circuitry 11a. The memory 13a may be configured to store received or transmitted data and/or executable program instructions. The memory 13a may be any suitable type of computer readable memory and may be of volatile and/or non-volatile type.

The originating node 10a, according to some aspects, further comprises processing circuitry 12a, which is any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry. The processing circuitry 12a is configured to receive discovery signals from nodes in the at least two possible transmission paths and to estimate, based on the received discovery signals, radio channels H for transmission from the originating node to the nodes transmitting the discovery signals.

The processing circuitry 12a is further configured to calculate, for different transmission modes, based on the estimated radio channels, metrics of links from the originating node to the nodes transmitting the discovery signals, wherein at least one of the transmission modes involves simultaneous transmission from the originating node to at least two of the nodes transmitting the discovery signals and to transmit the calculated metrics to an adjacent node.

According to some aspects the processing circuitry 12a is configured to cause the originating node 10a to transmit, for the different transmission modes, transmission properties corresponding to the calculated metrics.

According to some aspects the originating node 10a comprises modules configured to perform the methods described above. The modules are implemented in hardware or in software or in a combination thereof. The modules are according to one aspect implemented as a computer program stored in a memory 13a which run on the processing circuitry 12a being a CPU. According to some aspects, the modules are logical circuits in the processing circuitry 12a.

According to some aspects originating node 10a comprises a first receiver module 121a configured to receive discovery signals from nodes 10c,10d,10e in the at least two possible transmission paths.

According to some aspects originating node 10a comprises an estimator 122a configured to estimate, based on the received discovery signals, radio channels (H) for transmission from the originating node to the nodes transmitting the discovery signals 10c,10d,10e.

According to some aspects originating node 10a comprises a calculator 123a configured to calculate, for different transmission modes, based on the estimated radio channels, metrics of links from the originating node to the nodes transmitting the discovery signals 10c, 10d, 10e, wherein at least one of the transmission modes involves simultaneous transmission from the originating node to at least two of the nodes transmitting the discovery signals 10c, 10d, 10e and According to some aspects originating node 10a comprises a first transmitter module 124a configured to transmit the calculated metrics to an adjacent node.

According to some aspects originating node 10a comprises a second receiver module 125a configured to receive from at least one of the nodes transmitting the discovery signals 10c,10d,10e, in response to the path request, information indicating at least one transmission path to use for transmitting data from the originating node to the target node.

Figure 6B:
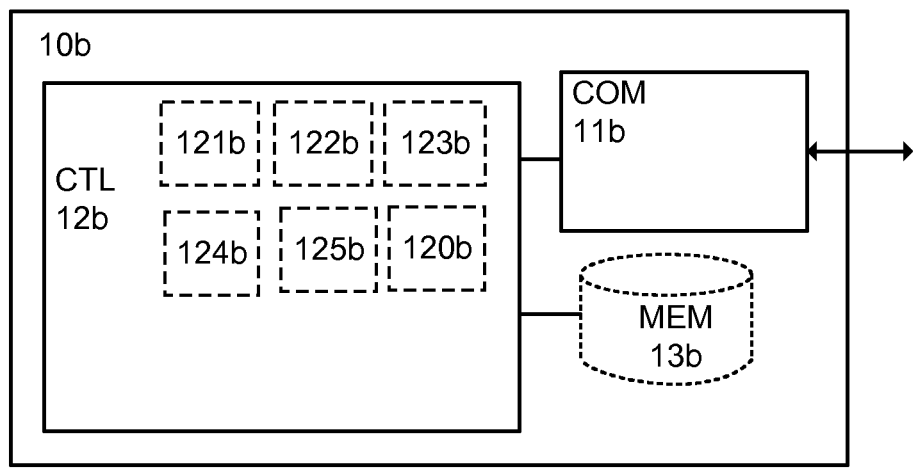
FIG. 6b is a schematic diagram illustrating a target node.

FIG. 6b illustrates an example node configuration of a target node 10b in a wireless network comprising several nodes 10a-e wirelessly connected to each other, wherein the target node is configured to select a transmission path from the originating node 10a to the target node 10b, wherein there are at least two possible transmission paths between the originating node and the target node.

According to some aspects, the target node is a wireless device or network node. In some embodiments the wireless node is the source of data packet (for instance originated on application level in the wireless node). In other embodiments, the wireless node is a network node where data packet may have been received via a wired backhaul. It may just as well be the other way around, that the target node is connected, or actually that both nodes are connected to an external wired or wireless network. The proposed methods may e.g. be implemented in a sensor network where the information flow is from one or several sensors to a server on the internet. In another embodiment the wireless node receive the data packet from another wireless node 10f. The originating node determines the target node for the data packet, typically by reading an address in a packet header associated to the target or destination node.

As shown in FIG. 6b, the target node 10b comprises a communication interface or radio circuitry 11b including antennas configured to receive and transmit any form of communications or control signals within a network. In other words, the target node comprises a communication interface 11b configured for wireless communication with other nodes 10 a, c-e in the wireless network. It should be appreciated that the radio circuitry 11b according to some aspects comprises any number of transceiving, receiving, and/or transmitting units or circuitry. It should further be appreciated that the radio circuitry 11b may be in the form of any input/output communications port known in the art. The radio circuitry 11b according to some aspects comprises RF circuitry and baseband processing circuitry (not shown).

The target node 10b, according to some aspects, further comprises at least one memory unit or circuitry 13b that may be in communication with the radio circuitry 11b. The memory 13b may be configured to store received or transmitted data and/or executable program instructions. The memory 13b may be any suitable type of computer readable memory and may be of volatile and/or non-volatile type.

The target node 10b, according to some aspects, further comprises processing circuitry 12b, which is any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry. The processing circuitry 12b is configured to receive from nodes 10c,10d,10e in the at least two possible transmission paths, for different transmission modes, metrics of links in transmission paths from the originating node to the nodes 10c, 10d,10e transmitting the metrics, wherein at least one of the transmission modes involves simultaneous transmission from the originating node to at least two of the nodes 10c,10d,10e and to estimate, radio channels (H) for transmission from the respective nodes 10c,10d,10e transmitting the metrics to the target node. The processing circuitry 12b is further configured to calculate, based on the estimated radio channels H, metrics of links from the nodes 10c,10d, 10e transmitting the metrics, to the target node and to select at least one transmission path to use for transmission from the originating node to the target node, by calculating and comparing accumulated path metrics from the originating node to the target node of the different transmission modes, based on the received and calculated metrics, for the different transmission modes.

According to some aspects the target node 10b comprises modules configured to perform the methods described above. The modules are implemented in hardware or in software or in a combination thereof. The modules are according to one aspect implemented as a computer program stored in a memory 13b which run on the processing circuitry 12b being a CPU. According to some aspects the modules are logical circuits in the processing circuitry 12b.

According to some aspects the target node 10b comprises a first receiver module 120b configured to receive discovery signals from nodes in the at least two possible transmission paths.

According to some aspects the target node 10b comprises a second receiver module 121b configured to receive from nodes 10c,10d,10e in the at least two possible transmission paths, for different transmission modes, metrics of links in transmission paths from the originating node to the nodes 10c,10d,10e transmitting the metrics.

According to some aspects the target node 10b comprises an estimator 122b configured to estimate radio channels H for transmission from the nodes 10c,10d,10e transmitting the metrics to the target node, According to some aspects the target node 10b comprises a calculator 123b configured to calculate, based on the estimated radio channels H, metrics of links from the nodes 10c,10d,10e transmitting the metrics, to the target node.

According to some aspects the target node 10b comprises a selector 124b configured to select at least one transmission path to use for transmission from the originating node to the target node, by calculating and comparing accumulated path metrics from the originating node to the target node of the different transmission modes, based on the received and calculated metrics, for the different transmission modes.

According to some aspects the target node 10b comprises a transmitter module 125b configured to transmit a response indicative of the selected transmission path.

FIGS. 7 and 8 are flowcharts of the different modes a node may operate in when setting up the paths, from source to target, that are used in path diversity mesh networking.

Figure 7A:
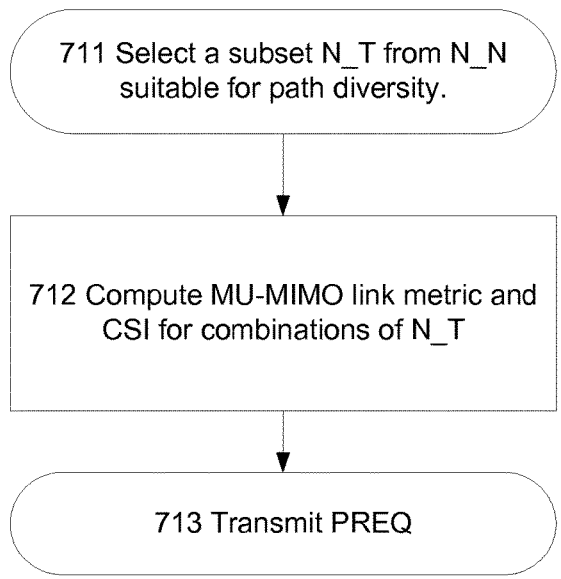
FIG. 7a is a flow chart illustrating transmitting a PREQ at a source node.

FIG. 7a is a flow chart illustrating methods of transmitting a PREQ at a source node according to one example implementation. In the mesh network all nodes listen to discovery signals or beacons from their adjacent nodes in order to identify adjacent nodes and to estimate the channel H to respective adjacent node. When a source node has data to transmit, the source node selects 711 a subset N_T from N_N node suitable for path diversity and computes 712 MU-MIMO link metrics and CSI for combinations of N_T. Here N_N is the set of all neighbor nodes from which beacons are received (or otherwise known). From this a subset of transmission nodes, N_T, is chosen. As a source node, the node then transmits 713 a PREQ, possibly including information regarding what kind of network optimization is preferred with respect to the coming traffic, e.g., throughput, latency or packet error rate.

Figure 7C:
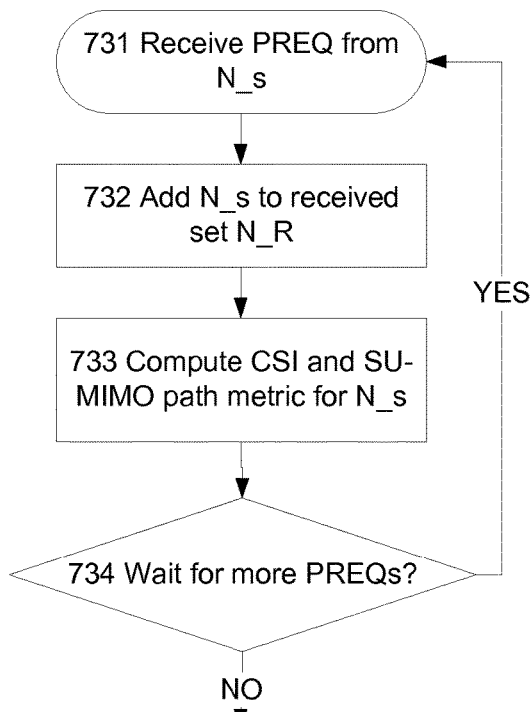
FIG. 7c is a flow chart illustrating receiving a PREQ and transmitting a PREQ at an intermediary node.
Figure 7B:
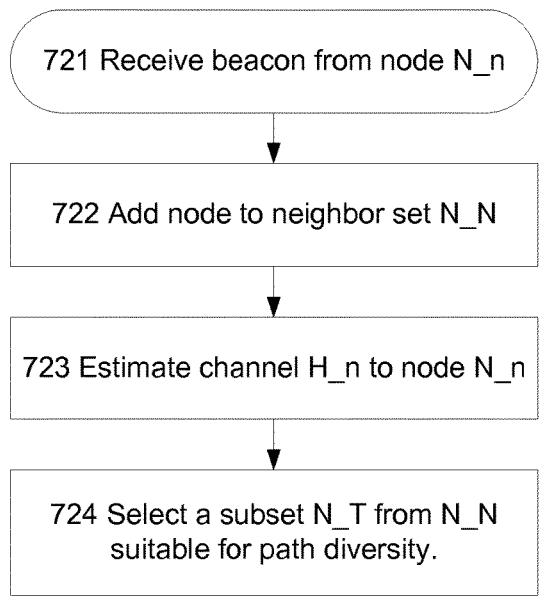
FIG. 7b is a flow chart illustrating receiving beacons or discovery signals at all nodes.

FIG. 7b is a flow chart illustrating the principle of receiving discovery signals or beacons, which may be a continuous process in all nodes in a mesh network. This process typically involves the node receiving 721 beacons from the neighbor nodes. When a new neighbor node is discovered the node adds 722 the node to neighbor set N_N and estimates 723 a channel H_n to node N_n and again selects 724 a subset N_T from N_N suitable for path diversity. Note that these steps are part of the proposed methods, but may as well have been performed before the actual path selection.

FIG. 7c is a flow chart illustrating methods of transmitting a PREQ at an intermediary node. As an intermediary node, the node receives 731 the PREQ from node N_s, and adds 732 the transmitting node to a set N_R from which PREQs with the same unique PREQ identities, PREQ-ID, have been received. Here N_R denotes a set of nodes from which PREQs are received. The node then computes 733 CSI and SU-MIMO path metric for N_s. While the PREQ time window is still open the node waits 734 for more PREQs, and if more PREQs are received the same measures are taken. The PREQ time window may be a time window after which the node selects the best metric to include in the PREQ, or it may transmit several PREQs, one after each received PREQ resulting in a better metric than the previously transmitted PREQ.

Then the node selects 735 the best MU-MIMO path metric for each number of included nodes from N_R and finally forwards 736 PREQ to the next node in the path.

Figure 8A:
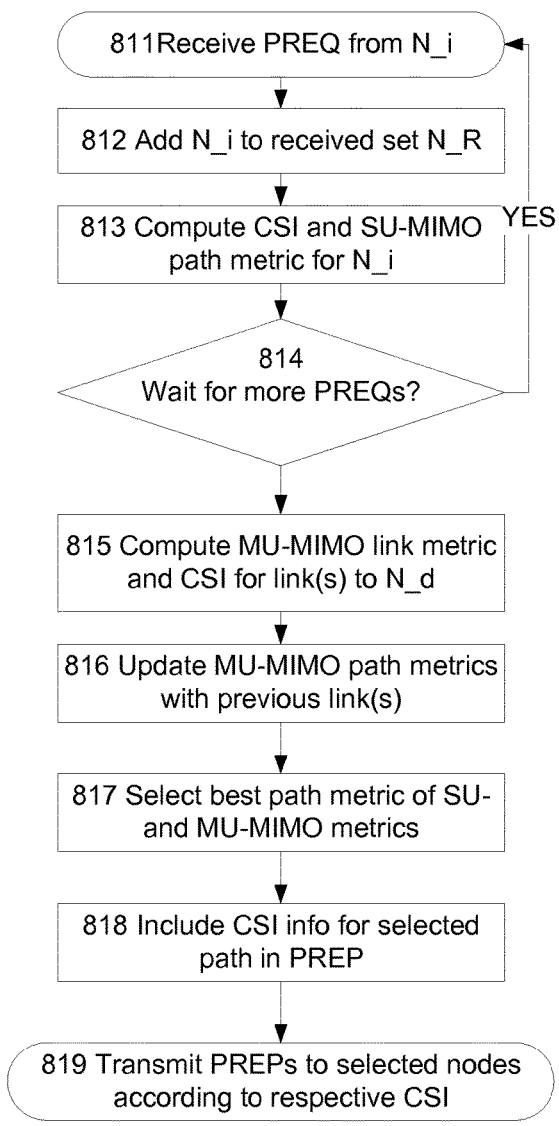
FIG. 8a is a flow chart illustrating receiving a PREQ and transmitting a PREP at a destination node.

FIG. 8a is a flow chart illustrating an example procedure of transmitting a PREP at a target node. First the node collects the PREQs within a given interval by receiving 811 PREQ from N_i, adding 812 node N_i to received set N_R, computing 813 CSI and SU-MIMO path metric for N_i and waiting 814 for more PREQs.

As a target node, the node analyses the PREQs from several intermediary nodes and makes a decision of which node(s) to include in the transmission path. This may involve the steps of computing 815 MU-MIMO link metric and CSI for link(s) to N_d, updating 816 MU-MIMO path metrics with previous link(s), selecting 817 best path metric of SU- and MU-MIMO metrics and including 818 CSI info for selected path in a PREP. Then the node transmits 819 the PREP to the node(s), included in the path, including CSI information for proper MU-MIMO reception at 10b.

Figure 8B:
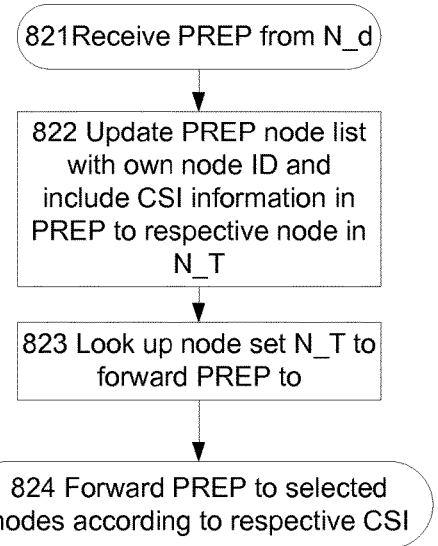
FIG. 8b is a flow chart illustrating receiving a PREP and transmitting a PREP at an intermediary node.

FIG. 8b is a flow chart illustrating methods of transmitting a PREP at an intermediary node. As an intermediary node by updating and forwarding the PREP to the source node. This procedure may include the steps of the intermediate node receiving 821 a PREP from node N_d and updating 822 a PREP node list with the own node ID and including The, Channel State Information, CSI information in the PREP to respective node in N_T. The CSI tells the transmitter node what MCS, Rank, and PMI etc. it should use in order for the receiver to be able to receive it correctly. The intermediate node further looks up 823 a node set N_T to forward the PREP to and finally forwarding 824 the PREP to the selected nodes in the node set N_T according to respective CSI.

Figure 8C:
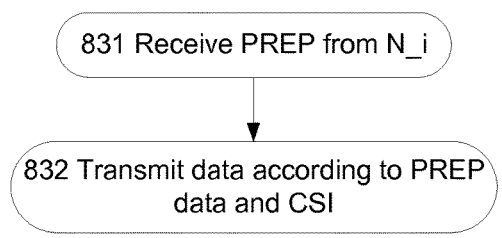
FIG. 8c is a flow chart illustrating receiving a PREP and transmitting data at a source node.

FIG. 8c is a flow chart illustrating methods of receiving a PREP at a source node. As a source node, the node receives 831 the different PREPs and starts transmitting 832 data according to data and CSI defined in the PREP.

It should be noted that although terminology from 3GPP LTE or IEEE 802.11s has been used herein to explain the example embodiments, this should not be seen as limiting the scope of the example embodiments to only the aforementioned system. Other wireless systems, including Bluetooth, WiFi (IEEE 802.11), WCDMA, WiMax, Ultra Mobile Broadband, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Within the context of this disclosure, the terms "wireless terminal" or "wireless device" encompass any device which is able to communicate wirelessly with another device, as well as, optionally, with an access node of a wireless network by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices.

Hence, whenever a "user equipment" or "UE" is referred to in this disclosure, this should be understood as encompassing any wireless device as defined above.

The various example embodiments described herein are described in the general context of method steps or processes, which may be implemented according to some aspects by a computer program, comprising computer readable code which, when run on an node in a contention based communication system, causes the node to perform the method according to above. The computer program, embodied in a computer-readable medium, includes computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a originating node in a wireless network comprising several nodes wirelessly connected to each other, for enabling selection of a transmission path from the originating node to a target node, wherein there are at least two possible transmission paths between the originating node and the target node, the method comprising:
receiving discovery signals from nodes in the at least two possible transmission paths;
estimating, based on the received discovery signals, radio channels for transmission from the originating node to the nodes transmitting the discovery signals;
calculating, for different transmission modes and based on the estimated radio channels, metrics of links from the originating node to the nodes transmitting the discovery signals; wherein at least one of the transmission modes involves simultaneous transmission from the originating node to at least two of the nodes transmitting the discovery signals; and
transmitting the calculated metrics to an adjacent node.

2. The method of claim 1, wherein the transmitting comprises transmitting, for the different transmission modes, transmission properties corresponding to the calculated metrics.

3. The method of claim 2, wherein the metrics and/or the transmission properties are comprised in a path request.

4. The method of claim 3, further comprising receiving, from at least one of the nodes transmitting the discovery signals and in response to the path request, information indicating at least one transmission path to use for transmitting data from the originating node to the target node.

5. The method of claim 4, wherein the received information is comprised in a path reply.

6. The method of claim 2, wherein the transmission properties comprise one or more of: time/frequency resources, modulation and coding scheme, Multiple-Input-Multiple-Output (MIMO) scheme, rank, and/or precoding matrix.

7. The method of claim 1, wherein the transmission modes comprises one of:
- a Multi User Multiple-Input-Multiple-Output (MIMO) transmission to at least two nodes, wherein different data streams are allocated to respective nodes;
- a duplex transmission to at least two nodes, wherein data is split over different time/frequency resources to respective nodes;
- a diversity transmission where same data is transmitted to several nodes; or
- a unicast transmission to one node.

8. The method of claim 7:
- wherein the transmission mode comprises a duplex transmission to at least two nodes, wherein data is split over different time/frequency resources to the respective nodes; and
- wherein the transmission mode defines which time/frequency resources to use for each respective link.

9. The method of claim 1, wherein the metric defines a cost in terms of time and/or frequency and/or code resources required for transmission of data on the link.

10. The method of claim 1, wherein the metric is an Air Time Link Metric.

11. A non-transitory computer readable recording medium storing a computer program product for controlling an originating node in a wireless network comprising several nodes wirelessly connected to each other, for enabling selection of a transmission path from the originating node to a target node, wherein there are at least two possible transmission paths between the originating node and the target node, the computer program product comprising software instructions which, when run on processing circuitry of the originating node, causes the originating node to:
- receive discovery signals from nodes in the at least two possible transmission paths;
- estimate, based on the received discovery signals, radio channels for transmission from the originating node to the nodes transmitting the discovery signals;
- calculate, for different transmission modes and based on the estimated radio channels, metrics of links from the originating node to the nodes transmitting the discovery signals; wherein at least one of the transmission modes involves simultaneous transmission from the originating node to at least two of the nodes transmitting the discovery signals; and
- transmit the calculated metrics to an adjacent node.

12. An originating node in a wireless network comprising several nodes wirelessly connected to each other, wherein the originating node is configured to enable selection of a transmission path from the originating node to a target node, wherein there are at least two possible transmission paths between the originating node and the target node, the originating node comprising:
- a communication interface configured for wireless communication with other nodes in the wireless network; and
- processing circuitry configured to cause the originating node to:
  - receive discovery signals from nodes in the at least two possible transmission paths;
  - estimate, based on the received discovery signals, radio channels (H) for transmission from the originating node to the nodes transmitting the discovery signals;
  - calculate, for different transmission modes and based on the estimated radio channels, metrics of links from the originating node to the nodes transmitting the discovery signals, wherein at least one of the transmission modes involves simultaneous transmission from the originating node to at least two of the nodes transmitting the discovery signals; and
  - transmit the calculated metrics to an adjacent node.

13. The originating node of claim 12, wherein the processing circuitry is configured to cause the originating node to transmit, for the different transmission modes, transmission properties corresponding to the calculated metrics.

14. A method, performed in a target node in a wireless network comprising several nodes wirelessly connected to each other, for selecting a path for transmission from an originating node to the target node, wherein there are at least two possible transmission paths between the originating node and the target node, the method comprising:
- receiving, from nodes in the at least two possible transmission paths and for different transmission modes, metrics of links in transmission paths from the originating node to the nodes transmitting the metrics, wherein at least one of the transmission modes involves simultaneous transmission from the originating node to at least two of the nodes;
- estimating radio channels for transmission from the nodes transmitting the metrics to the target node;
- calculating, based on the estimated radio channel, metrics of links from the nodes transmitting the metrics to the target node; and
- selecting at least one transmission path to use for transmission from the originating node to the target node, by calculating and comparing accumulated path metrics from the originating node to the target node of the different transmission modes, based on the received and calculated metrics, for the different transmission modes.

15. The method of claim 14, wherein the received metric is comprised in a path request.

16. The method of claim 14, wherein the estimating comprises estimating the radio channels using the path request.

17. The method of claim 14, further comprising selecting transmission properties corresponding to the at least one selected transmission path.

18. The method of claim 14, further comprising transmitting a response indicative of the selected transmission path.

19. The method of claim 14:
- further comprising receiving discovery signals from nodes in the at least two possible transmission paths;
- wherein the estimating is based on the received discovery signals.

20. A non-transitory computer readable recording medium storing a computer program product for controlling a target node in a wireless network comprising several nodes wirelessly connected to each other, for selecting a path for transmission from an originating node to the target node, wherein there are at least two possible transmission paths between the originating node and the target node, the computer program product comprising software instructions which, when run on processing circuitry of the target node, causes the target node to:
- receive, from nodes in the at least two possible transmission paths and for different transmission modes, metrics of links in transmission paths from the originating node to the nodes transmitting the metrics, wherein at least one of the transmission modes involves simultaneous transmission from the originating node to at least two of the nodes;
- estimate radio channels for transmission from the nodes transmitting the metrics to the target node;

calculate, based on the estimated radio channel, metrics of links from the nodes transmitting the metrics to the target node; and select at least one transmission path to use for transmission from the originating node to the target node, by calculating and comparing accumulated path metrics from the originating node to the target node of the different transmission modes, based on the received and calculated metrics, for the different transmission modes.

21. A target node in a wireless network comprising several nodes wirelessly connected to each other, wherein the target node is configured to select a transmission path from an originating node to a target node, wherein there are at least two possible transmission paths between the originating node and the target node, the target node comprising:

a communication interface configured for wireless communication with other nodes in the wireless network; and processing circuitry configured to cause the target node to:

receive, from nodes in the at least two possible transmission paths and for different transmission modes, metrics of links in transmission paths from the originating node to the nodes transmitting the metrics, wherein at least one of the transmission modes involves simultaneous transmission from the originating node to at least two of the nodes;

estimate radio channels for transmission from the respective nodes transmitting the metrics to the target node;

calculate, based on the estimated radio channels, metrics of links from the nodes transmitting the metrics to the target node; and select at least one transmission path to use for transmission from the originating node to the target node, by calculating and comparing accumulated path metrics from the originating node to the target node of the different transmission modes, based on the received and calculated metrics, for the different transmission modes.

\* \* \* \* \*